May 26, 1959     D. H. WEINFELD     2,887,974
MULTIPLE PORTABLE SUPPORT MEANS
Filed March 9, 1956
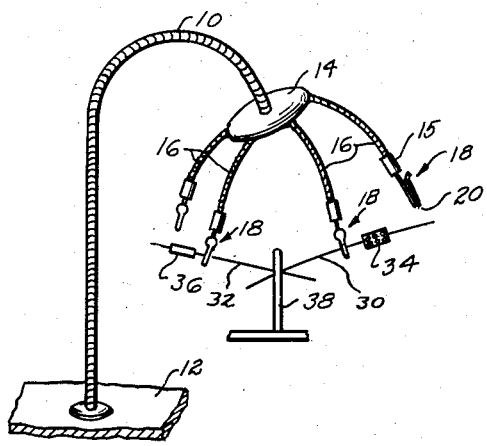
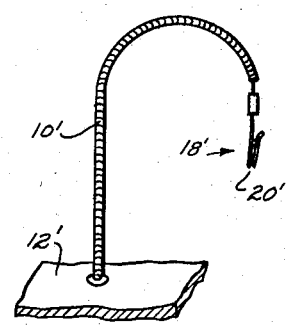
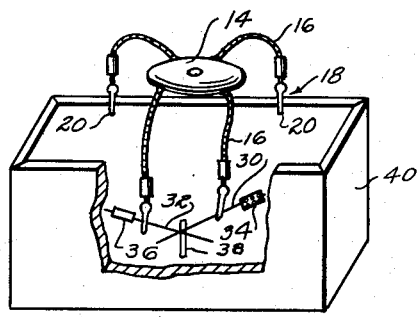
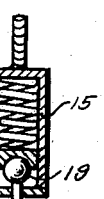
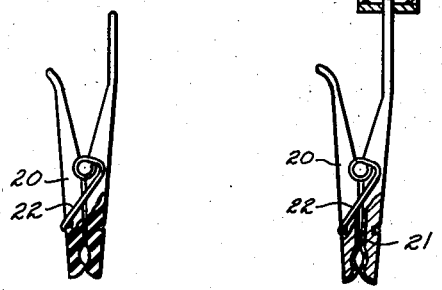
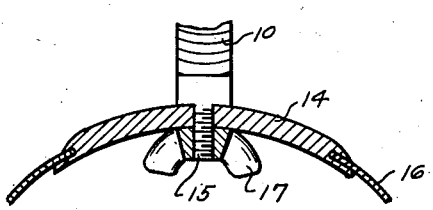
INVENTOR.
DAVID H. WEINFELD
BY
ATTORNEYS

United States Patent Office 2,887,974
Patented May 26, 1959

2,887,974

MULTIPLE PORTABLE SUPPORT MEANS

David H. Weinfeld, Cambridge, Mass.

Application March 9, 1956, Serial No. 570,647

1 Claim. (Cl. 113—104)

(Granted under Title 35, U.S. Code (1952), sec. 266)

The invention described herein may be manufactured and used by or for the United States Government for governmental purposes without payment to me of any royalty thereon.

This invention relates to a device for holding parts in position and further to multiple, portable support means for use in holding articles or parts being processed in predetermined associated position.

In the assembling of electronic circuits where two or more separate wires or parts are to be attached by soldering, or other means, to one another or to binding posts or the like, a great deal of difficulty is experienced in holding the parts in place while the soldering connecting the parts is being done. If the operator has to use one hand to hold the parts in place he must either tin each part separately and then press them together in contact with the soldering iron, or he may try to press them together and then bring up the solder, melted, on the tip of the iron. The former method involves extra operations while the latter is awkward and wastes the resin core of the solder as well as considerable time, and is very often ineffective and uncertain.

Another common difficulty, when several leads are being soldered to a terminal one by one, is that, as the last leads are being soldered, the solder holding the first leads is melted, letting them fall away.

The object of the invention is to provide a means whereby the ineffectiveness and uncertainty of the above operation is eliminated.

A further object of this invention is to provide a device which will hold the leads or parts to be secured by solder securely in contact with a terminal, or any other place of installation in the wiring arrangement, leaving the hands free for performing the soldering operation.

A further object of the invention is to provide a portable means for holding parts of an electric circuit in place or in contact so that they can be permanently secured together by soldering or other means without the manual support or holding thereof.

A further object of the invention is the provision of a supporting device which has a plurality of flexible extended portions each provided with means for holding articles in predetermined associated relation while soldering them together.

A further object of the invention is the provision of a device for holding lead wires or other elements in an electric circuit in place within a chassis or other location of permanence while these wires or other parts are being soldered or otherwise permanently secured.

A further object of the invention is the provision of a device which has a plurality of flexible adjustable members for holding in predetermined association the elements being processed.

A further object of the invention is the provision of an elongated flexible angularly adjustable supporting means for holding articles being processed in predetermined associated relation which articles are located in otherwise inaccessible places.

Other objects and advantages will be perceived as the description proceeds.

In the drawings, Figure 1 is a perspective view of the device;

Fig. 2 is a perspective view of the device showing one of its uses;

Fig. 3 is a perspective view of a modified form of the device showing a single, flexible angularly adjustable arm and a single article-supporting clip;

Fig. 4 is a detail cross-sectional view of the connection between the plate and the main arm;

Fig. 5 is a side elevation of a clip partly in cross-section;

Fig. 6 is a detail view partly in cross-section and partly in elevation of a modified clip and its connection.

Referring more in detail to the drawings, a flexible arm 10 is attached to any suitable standard or support means 12. The arm 10 is of the ordinary gooseneck form and easily and uniformly bendable, deformable and shape-retaining throughout its length. A plate 14 is secured to the outer end of the arm 10 by any suitable means, preferably for relative rotation. One possible expedient for this purpose is shown in Fig. 4 where a reduced screw-threaded member 15 on the end of the arm 10 extends through a centrally located opening in the plate 14 and is engaged by a wing nut 17. A plurality of secondary arms 16 are each attached to the plate 14 and extend radially from its circumference. The arms 16 are of any suitable flexible material. They are uniformly bendable, deformable and form or position-retaining throughout their length. The arms 16 are preferably smaller than the main arm 10. Each arm 16 carries an article-supporting clip member 18 rotatably secured thereto. This clip may be of the alligator, or any other suitable type. The joint 15 is of any standard form. It may be a swiveling banana plug, or a ball and socket joint with lock and screw.

Fig. 6 shows a spring-biased ball 19 rotatable within the casing 15 and longitudinally movable therein, the important qualification being that it is rotatable so that the clip 18 may be rotated to any desired position and retained in said position. The clip is conventional and comprises a pair of biting jaws 20 urged into clamping relationship to each other by a spring 22. The jaws 20 may be of electrical conducting or non-conducting material or they may be provided with an insulating lining 21 as shown in Fig. 6. When the clips are electrically insulated from the small, flexible members which support them, the invention may be used for holding test leads in safe positions in very temporary laboratory test circuits.

In the device shown in Fig. 3, a single flexible bendable support or gooseneck 10' is secured to a suitable base or standard 12' and carries a single clip 18' rotatably secured to its outer end. This elongated single flexible element carrying a single clip, is especially adapted for holding articles in position for soldering in locations which otherwise would be inaccessible with the multiple arm arrangement, or with the usual soldering methods. The flexible arm 10' and the clip 18', by virtue of their flexibility and comparatively small diameter, can reach places that would otherwise be reached with great difficulty or not at all.

In Figs. 1 and 2, a pair of conducting wires 30 and 32, each of which may carry a part such as a condenser 34 or resistor 36, are held together and in contact with a terminal post 38.

In Fig. 2, the plate carrying the flexible supporting arms 16 has been removed from the arm 10 and the multiple supporting device is used by itself, independently of any standard or support. Two of the clips are clipped over the edge of a chassis casing 40. This feature enables the use of the device in the installation and securing of parts in places which would otherwise be inaccessible for ordinary soldering or processing purposes.

For purposes of exemplification particular embodiments of the invention have been shown and described according to the best present understanding thereof. However, it will be apparent that many changes and modifications in the arrangement and construction of the parts thereof may be resorted to without departing from the true spirit and scope of the invention.

I claim:

A support for holding articles to be processed comprising a main arm universally bendable, deformable and shape retaining throughout its length, a plate removably secured to the outer end of said main arm, a plurality of seconadry arms secured to the periphery of said plate, said secondary arms being universally bendable, deformable and shape retaining throughout their length, a clip on the end of each secondary arm for attachment to and placement of a work piece, an axially spring biased ball mounting for each clip, whereby the capability for adjustment of the work holding clip is axially spring biased and universal, and whereby capability of movement of said main arm for positioning of said plate, and the capability of movement of said secondary arms for accommodation of said clips to said work piece for the positioning of said work piece, is universal, gradual and continuous throughout their entire extent.

References Cited in the file of this patent

UNITED STATES PATENTS

| | | |
|---|---|---|
| 546,421 | Duke | Sept. 17, 1895 |
| 574,529 | Elliott | Jan. 5, 1897 |
| 1,323,127 | Treuthardt | Nov. 25, 1919 |
| 1,530,802 | Andersen | Mar. 24, 1925 |
| 2,324,803 | Snyder | July 20, 1943 |
| 2,510,198 | Tesmer | June 6, 1950 |

FOREIGN PATENTS

| | | |
|---|---|---|
| 804,357 | France | Aug. 3, 1936 |
| 47,247 | France (Addition) | Nov. 25, 1936 |
| 965,792 | France | Feb. 22, 1950 |
| 854,100 | Germany | Oct. 20, 1952 |